(12) United States Patent
Crapet

(10) Patent No.: US 11,503,898 B2
(45) Date of Patent: Nov. 22, 2022

(54) APPLICATOR FOR COSMETIC PRODUCT, IN PARTICULAR MASCARA, ASSOCIATED APPLICATOR UNIT AND METHOD FOR MANUFACTURING SUCH AN APPLICATOR

(71) Applicant: Albea Services, Gennevilliers (FR)

(72) Inventor: Yann Crapet, Fremecourt (FR)

(73) Assignee: Albea Services, Gennevilliers (FR)

( * ) Notice: Subject to any disclaimer, the term of this patent is extended or adjusted under 35 U.S.C. 154(b) by 161 days.

(21) Appl. No.: 16/680,499

(22) Filed: Nov. 12, 2019

(65) Prior Publication Data
US 2020/0146425 A1    May 14, 2020

(51) Int. Cl.
| A45D 40/26 | (2006.01) |
| A46B 9/02 | (2006.01) |
| B33Y 10/00 | (2015.01) |
| B33Y 80/00 | (2015.01) |

(52) U.S. Cl.
CPC ............ *A45D 40/265* (2013.01); *A46B 9/021* (2013.01); *A46B 9/028* (2013.01); *A46B 2200/106* (2013.01); *B33Y 10/00* (2014.12); *B33Y 80/00* (2014.12)

(58) Field of Classification Search
CPC .... A45D 40/262; A45D 40/265; A46B 9/021; A46B 9/025; A46B 9/06; A46B 2200/1046; A46B 2200/1053; A46B 2200/106; A46D 1/02; A46D 1/00
See application file for complete search history.

(56) References Cited

U.S. PATENT DOCUMENTS

| D752,878 S | * | 4/2016 | Jacob | .............................. D4/128 |
| 2004/0011375 A1 | * | 1/2004 | Dumler | ................ A46D 1/0276 |
| | | | | 132/218 |
| 2008/0142034 A1 | * | 6/2008 | Manici | ................. A45D 40/262 |
| | | | | 132/218 |
| 2008/0219748 A1 | * | 9/2008 | Salciarini | ................ B22F 10/20 |
| | | | | 401/129 |
| 2014/0016985 A1 | * | 1/2014 | Osvaldo | ............... A46D 1/0253 |
| | | | | 401/129 |
| 2018/0116388 A1 | * | 5/2018 | De Bardonneche | ... A46B 3/005 |
| 2018/0235358 A1 | * | 8/2018 | Rees | .................... A45D 40/262 |

FOREIGN PATENT DOCUMENTS

| FR | 1070463 | * | 1/2001 |
| FR | 2937514 | | 4/2010 |

* cited by examiner

*Primary Examiner* — Rachel R Steitz
(74) *Attorney, Agent, or Firm* — CRGO Global; Steven M. Greenberg

(57) ABSTRACT

The invention concerns an applicator for cosmetic product, including a core extending along a longitudinal extension direction, called main direction, and one or more protrusions integral with the core, the protrusions extending from a proximal end connected to the core to a free distal end along an elongation direction so as to define a length. At least some of the protrusions, called non-linear protrusions, have a non-linear generator over at least some of their length, and in that at least some of the non-linear protrusions are installed to constitute a plurality of groups in each of which the non-linear protrusions are arranged so as to delimit centrally a space forming a cosmetic product reservoir.

7 Claims, 6 Drawing Sheets

APPLICATOR FOR COSMETIC PRODUCT, IN PARTICULAR MASCARA, ASSOCIATED APPLICATOR UNIT AND METHOD FOR MANUFACTURING SUCH AN APPLICATOR

CROSS REFERENCE TO RELATED APPLICATIONS

This application claims priority under 35 U.S.C. § 119(a) to French patent application number 1860349, filed on Nov. 9, 2018, the entire teachings of which are incorporated herein by reference.

BACKGROUND OF THE INVENTION

Field of the Invention

The invention concerns an applicator for cosmetic product, in particular mascara, and an associated applicator unit. The invention furthermore concerns a method for the manufacturing of such an applicator.

Description of the Related Art

Mascara applicators can be obtained from fibrous elements maintained between the longitudinal portions of a twisted metal pin; they are thus commonly called "twisted brushes". The ends of the fibrous elements usually form envelopes along a longitudinal extension direction of the brush. The twisted brushes have, via their manufacturing method, a cylindrically-shaped envelope which offers not very many options in terms of make-up effects. Numerous solutions have already been proposed to give varied shapes to twisted brushes.

Mascara applicators can also be obtained by injection moulding of plastic material, they are thus commonly called "plastic brushes". Thus, plastic brushes can have original shapes in order to propose particular make-up effects.

However, there is still a need to improve mascara applicators, in particular to obtain applicators ensuring a sufficient load of cosmetic product and a good return of it, while conserving a flexibility of application of the cosmetic product.

BRIEF SUMMARY OF THE INVENTION

The invention concerns an applicator for cosmetic product, including a core extending along a longitudinal extension direction X, called main direction, and a plurality of protrusions integral with the core, the protrusions extending from a proximal end connected to the core towards a free distal end along an elongation direction so as to define a length.

According to the invention, at least some of the protrusions, called non-linear protrusions, have a non-linear generator over at least some of their length. Some of the non-linear protrusions are implanted to constitute a plurality of groups in each of which the non-linear protrusions are arranged so as to delimit centrally a space forming a cosmetic product reservoir.

In other words, the protrusions are arranged on the surface of the core such that they define the limits of a volume defining a cosmetic product storage area. Thus, their arrangement makes it possible to form, in their centre, a cosmetic product reservoir. The cosmetic product is thus confined in this volume. The applicator can thus keep more cosmetic product when it is wiped, in particular during its exit from a container for storing the cosmetic product. The applicator thus has an important load of cosmetic product to be able to make-up the whole area to make-up at once, or even several areas.

Moreover, the non-linear profile of the protrusions advantageously makes it possible to increase the length of the protrusion and thus create a flexibility effect during make-up.

According to different embodiments, which can be taken together or separately:
protuberances protrude from the core,
the protuberances are arranged all around the periphery of the core,
the protuberances have a tapered profile,
the group of protrusions includes at least two non-linear protrusions,
the group of protrusions includes at least three non-linear protrusions,
the space forming a reservoir has a polygonal transversal cross-section, each of the protrusions being a peak of the polygon,
all or some of the non-linear protrusions have at least one helicoidal winding over at least one portion of their length, called helicoidal winding portion,
the helicoidal winding has at least one turn,
all the protrusions have a helicoidal winding,
the at least one helicoidal winding is situated on a portion radially distal from the protrusions,
the at least one helicoidal winding extends over at least ¼ of the length of the protrusions, or even over at least ⅓, ½, ⅔, ¾, of the length of the protrusions,
the at least one helicoidal winding extends over the whole length of the protrusions,
the protrusions include at least one groove,
the groove extends parallel to the at least one helicoidal winding,
the groove extends by winding around the protrusion,
the transversal cross-section of the protrusions has at least one groove, or even two, or even three, or even four grooves,
the groups of protrusions are arranged in the form of longitudinal rows, the rows being substantially parallel to the main direction X,
the groups of protrusions are arranged in the form of longitudinal rows, the rows winding helicoidally around the core,
the applicator is obtained by additive manufacturing.

The invention also concerns an applicator unit for cosmetic product, including:
a container including a body forming a reservoir intended to contain the cosmetic product, and
an applicator of the cosmetic product such as defined above, adapted to be fixed on the container, such that the applicator is housed inside the reservoir.

The invention finally concerns a method for manufacturing an applicator for cosmetic product, in particular mascara, such as defined above. The method includes:
a step of developing a digital model of the applicator;
a step of manufacturing the applicator by means of the digital model.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
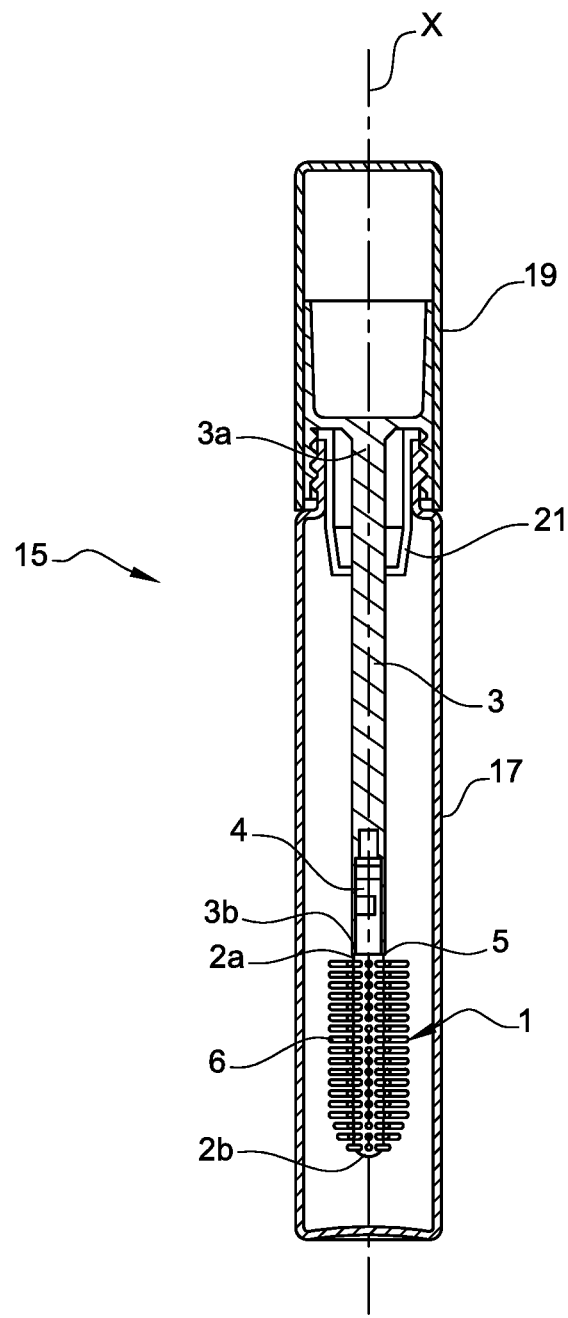
FIG. 1 is a cross-sectional view of an example of an applicator unit according to the invention.

As illustrated in FIG. 1, the invention concerns an applicator 1 for cosmetic product, in particular for mascara, including a core 2 extending along a longitudinal extension direction, called main direction and referenced X in FIG. 1.

The core 2 has a first end 2a, also called proximal end, capable of being fixed to an applicator 1 rod 3 by a sleeve 4 extending the core 2, and a second free end 2b, also called distal end, opposite the first end 2a along the main direction X. Conventionally, the sleeve 4 extends from a stop ring 5.

The core 2 can be solid or hollow without moving away from the scope of the invention.

The core 2 here has a transversal cross-section with respect to the main direction X which is circular. In embodiments not represented, the core 2 can also have a polygonal transversal cross-section, such as triangular, or in quadrilateral shape, without moving away from the scope of the invention.

The core 2 is preferably of transversal cross-section, substantially constant from its first end 2a to its second end 2b, at least up to a flared portion which can possibly be present at the level of the second end 2b of the core 2.

The applicator 1 further includes a plurality of protrusions 6 integral with the core 2. The core 2 and the protrusions 6 are thus made of one single part. It must be noted, that the sleeve 4 is devoid of protrusions 6.

The protrusions 6 protrude from the core 2. In other words, the protrusions 6 extend protruding from the core 2.

Advantageously, the protuberances 6 are arranged all around the periphery of the core 2.

In the embodiments represented in the different figures, certain protrusions 6 protrude from the core 2 following a substantially normal direction with respect to the main direction X, called radial direction, while other protrusions 6 protrude from the core 2 by forming an angle with the main axis X different by 90 ¬∞. In other words, certain protrusions 6 can be inclined towards the second end 2b of the core 2 or inclined towards the first end 2a of the core 2.

Advantageously, the protuberances have a tapered profile.

The protrusions 6 extend from a proximal end 6b connected to the core 2 to a free distal end 6a along an elongation direction so as to define a height H and a length L.

Figure 4:
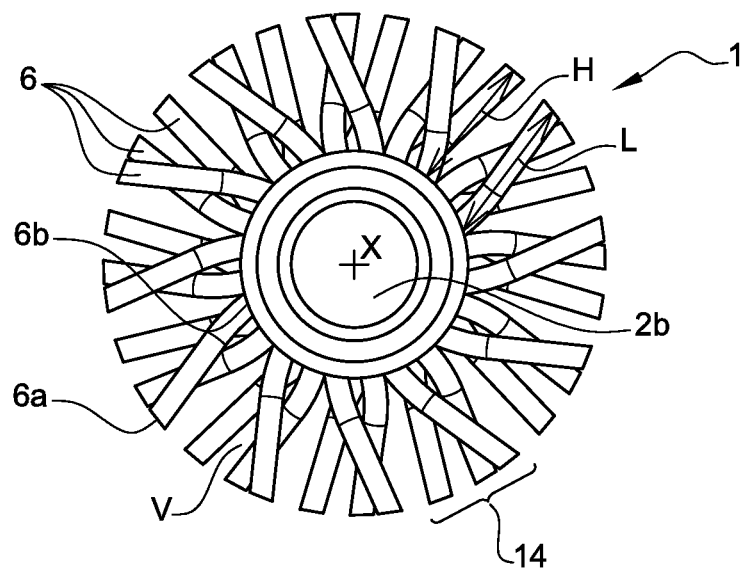
FIG. 4 is a top view of the applicator of FIG. 2.

By "height of the protrusions", this means the height H measured between the radial periphery of the core 2 and the free distal end 6a of the protrusion (see FIG. 4). In other words, by "height of the protrusions", this means their radial extension measured from the base of the protrusion 6, in projection over a plane orthogonal to the main axis X.

Thus, as indicated in FIG. 4, the height H of the protrusions 6 is around, for example, 4 mm.

By "length of the protrusions", this means the distance L measured from the base of the protrusion 6, i.e. from the proximal end 6b to the free distal end 6a (see FIG. 4).

By "the protrusions 6 protrude from the core 2 following a direction, substantially normal with respect to the main direction X", this means protrusions 6 which protrude in a plane including the main direction X and a radial direction of the main direction X. In other words, the protrusions 6 can be inclined, in this plane, towards the proximal and/or distal end, this without moving away from the scope of the invention.

Preferably, the protrusions 6 all have substantially one same height H. In other words, the distance between the radial periphery of the core 2 and the free end 6a of the protrusions 6 is substantially the same for all the protrusions 6 that includes the applicator 1. The protrusions 6 thus form a substantially cylindrical envelope.

Figure 2:
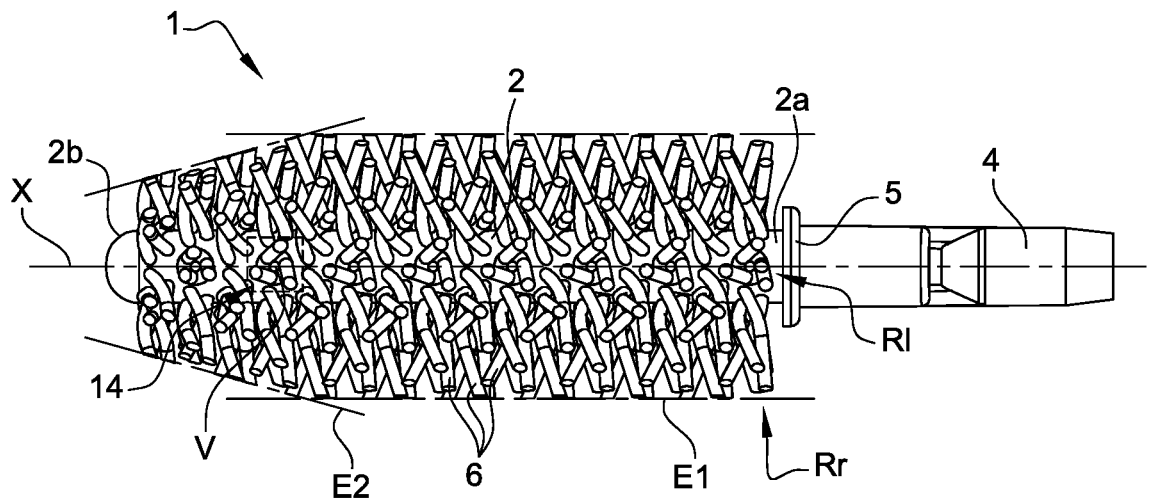
FIG. 2 is a side view of an applicator according to a first embodiment.
Figure 5:
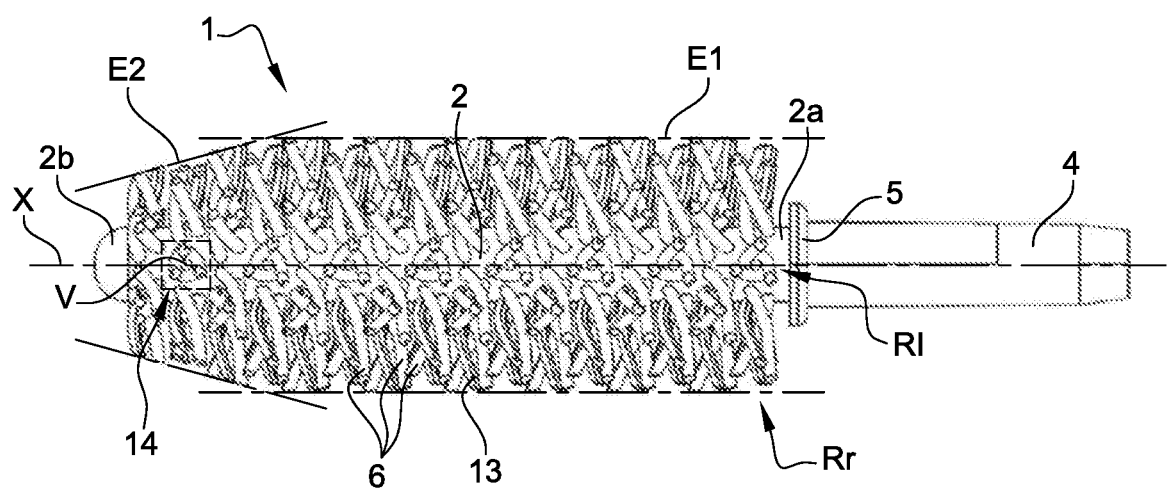
FIG. 5 is a side view of an applicator according to a second embodiment.
Figure 8:
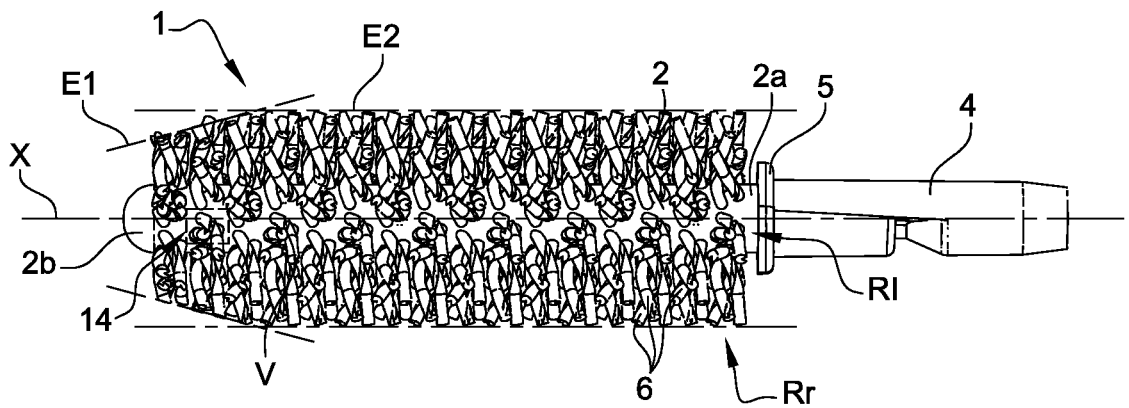
FIG. 8 is a side view of an applicator according to a third embodiment.

However, the protrusions 6 called distal protrusions, i.e. the protrusions 6 which extend to the proximity of the second end 2b of the core 2 can have different heights H, so as to, for example, form an ogive-shaped envelope E2 as represented in FIGS. 2, 5 and 8. The protrusions 6 which extend between the first end 2a of the core 2 and the distal protrusions 6 as for them form a substantially cylindrical envelope E1 (see FIGS. 2, 5 and 8).

The ogive-shaped envelope facilitates, in particular, the insertion of the applicator 1 through the neck of the container containing the cosmetic product and the application of the cosmetic product at the level of the inner corner of the eye.

In a non-represented embodiment variant, the protrusions 6 can have a height H different from one row Rl, Rr to the other (the rows Rl and Rr being described below in relation to the groups of protrusions).

The free distal ends 6a of the protrusions 6 thus form an envelope of which the shape can vary without moving away from the scope of the invention. For example, the height H of the protrusions 6 can vary inside one same longitudinal and/or radial row Rl, Rr, from the first end 2a to the second end 2b of the core 2, to form envelopes at least partially substantially concave, convex, even envelopes having several peaks.

In the embodiments represented here, the protrusions 6 have a transversal cross-section 7 whose dimension is constant from the proximal end 6b to the distal end 6a. The transversal cross-section 7 of a protrusion 6 is the cross-section made in a plane orthogonal to the longitudinal extension direction of the protrusion 6.

In an embodiment variant not represented, the dimensions of the transversal cross-section 7 are greater to near the proximal end 6b than near the distal end 6a of the protrusion 6. In other words, the transversal cross-section 7 of the protrusion 6 has dimensions which increase from the proximal end 6b towards the distal end 6a.

According to the invention, at least some of the protrusions have a non-linear generator, in particular helix-shaped, over at least partially its length L. These protrusions will subsequently be called non-linear protrusions.

Preferably, all or some of the non-linear protrusions 6 has at least one helicoidal winding 9 over at least one portion of their length L, called helicoidal winding portion 9.

By "helicoidal winding portion 9", this means a portion or section of the protrusion 6 which is wound in a helix around the elongation direction. This protrusion portion 6 has a generator which is non-linear, in particular helix-shaped.

In other words, some or all of the protuberances 6 are wound around the elongation direction along a curve of which a tangent at each point makes a constant angle with a given direction which is here the elongation direction.

The elongation direction is the direction from the base of the protuberance to its free end. It can be likened to an orthogonal axis or inclined relative to the main direction X. The axis can protrude from the core in a substantially normal direction relative to the main direction X, called radial direction or can protrude forming an angle with the main direction X different from 90 ¬∞, i.e. an axis inclined towards one of the ends of the core.

Advantageously, the helicoidal winding 9 has at least one turn. This allows in particular to form a sufficient path so as to improve the wrap of the parts to make up and therefore a better distribution of the cosmetic product.

The helicoidal winding 9 makes it possible to form a path (not represented), wherein the cosmetic product can be stored. An additional reservoir of cosmetic product is thus formed.

In addition, the helicoidal winding 9 makes it possible to increase the length L of the protrusion 6 and thus create a flexibility effect during putting on make-up. Thus, more flexible protrusions 6 are obtained, making it possible to return the cosmetic product over the portion to have make-up put on, seamlessly. The user thus has an impression of softness when they put on make-up.

The flexibility of the protrusions 6 also facilitates the entry and/or the exit of the applicator from the container.

Moreover, the helix shape of the protrusions makes it possible to best cover the portion to have make-up put on, in particular the eyelashes, and makes it possible for a better distribution of the cosmetic product. In the case of eyelashes, these can be housed in the path created by the helix-shape of the protrusions making it possible to surround the upper and lower surfaces of the eyelashes, just as well as its side portions. This makes it possible to increase their volume.

In the embodiments represented in the different figures, all the protrusions 6 have a helicoidal winding 9 extending over the whole length L.

In other embodiment variants not represented, the protrusions 6 can have a helicoidal winding 9 only over some of its length L. Preferably, the helicoidal winding portion 9 is situated on an outer portion of the protrusions 6, i.e. radially distal. In other words, the helicoidal winding portion 9 is situated between the middle of the length L and the free distal end 6a of the protrusion 6 or also beyond half in the direction of the free distal end 6a of the protrusion 6.

The helicoidal winding portion 9 can thus extend over at least ¼ of the length of the protrusions 6, even over at least ⅓, ½, ⅔, ¾, of the length of the protrusions 6.

It can also be considered, that the protrusions 6 have several helicoidal winding portions 9. The helicoidal winding portions 9 can, for example, be alternated with straight portions (not represented).

By "straight portion", this means a portion of the length of the protrusion 6 not having a helicoidal winding 9, in other words the generator of this portion is linear.

Furthermore, as represented in FIGS. 5 to 11, the protrusions 6 can include at least one groove 13.

The at least one groove 13 can extend over all or some of the length L of the protrusion 6. The groove 13 can extend over a protrusion portion 6 having a helicoidal winding 9 or over a straight portion. Thus, a grooved protrusion 6 or a grooved protrusion portion 6 is obtained.

The portions including at least one groove 13 can be alternated with smooth portions, i.e. protrusion portions 6 not including grooves 13.

The grooves 13 play the role of additional reservoir and thus make it possible for a larger storage of cosmetic product, in particular mascara.

Figure 6:
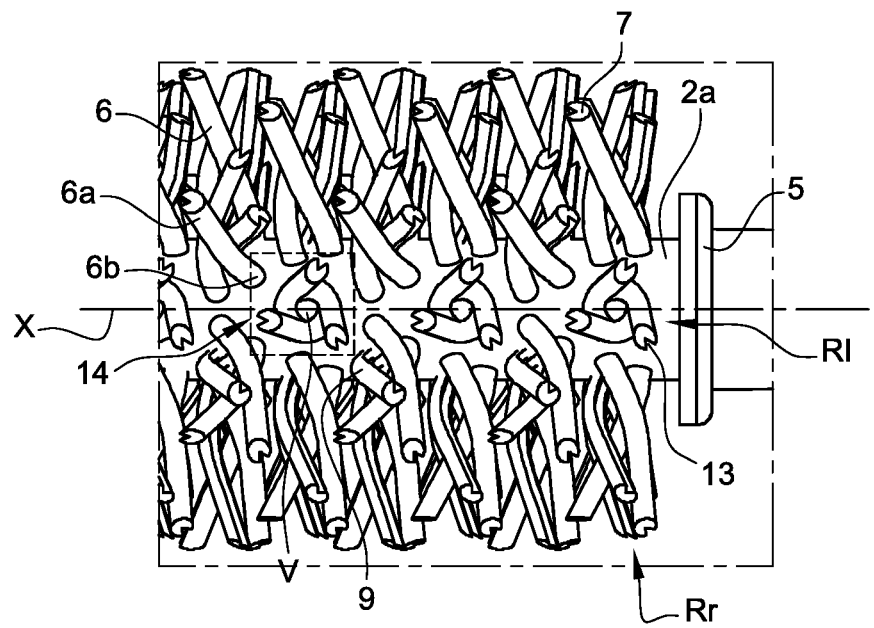
FIG. 6 is a side and detailed view of the protrusions of the applicator of FIG. 5.
Figure 7:
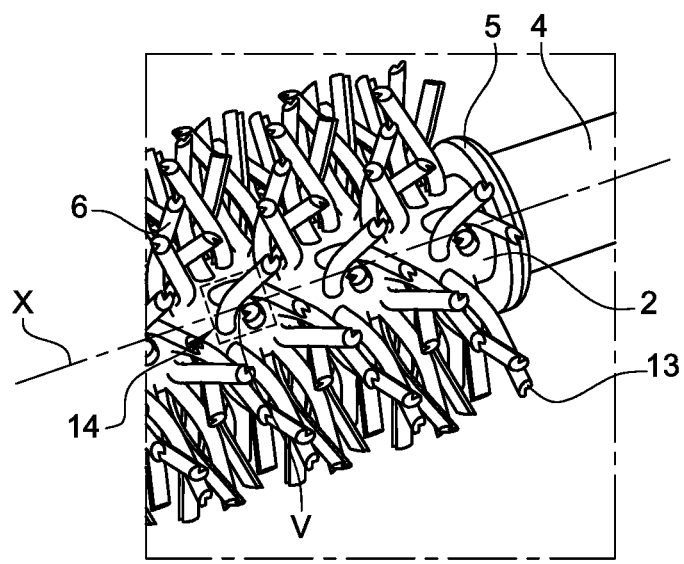
FIG. 7 is an isometric and detailed view of the protrusions of the applicator of FIG. 5.

As illustrated in FIGS. 5 to 7, the groove 13 can extend according to the profile of the protrusion 6. Thus, over a straight portion, the groove 13 is straight. In the case of a portion having a helicoidal winding 9, the groove 13 follows the helicoidal winding and extends parallel to this helicoidal winding 9 as this is represented in FIGS. 5 to 7.

In embodiment variants illustrated in FIGS. 8 to 11, the groove 13 can also extend by winding around the protrusion 6. This winding gives a torsion effect to the protrusion. The protrusion appears spiralled on itself.

Thus, the applicator 1 includes at least one protrusion 6 including at least one of the following protrusion portions 6:

protrusion portions 6 having a helicoidal and smooth winding 9, protrusion portions 6 having a helicoidal and grooved winding 9.

Moreover, without moving away from the scope of the invention, the applicator 1 can also include at least one of the following protrusion portions 6:

straight and smooth protrusion portions 6, straight and grooved protrusion portions 6.

In addition, some of the non-linear protrusions 6 is installed to constitute a plurality of groups 14 in each of which the protrusions 6 are arranged so as to delimit centrally a space (or volume) V forming a cosmetic product reservoir. In other words, the protrusions 6 are arranged on the surface of the core 2 such that they define the limits of the volume V creating, in their center, an area for storing cosmetic product.

So as to form this space V, each of the groups 14 includes at least two non-linear protrusions 6. Preferably, each of the groups 14 includes at least three non-linear protrusions 6.

The non-linear protrusions 6 of each group 14 are installed on the surface of the core 2 so as to form a polygon. Each peak of the polygon corresponds to a non-linear protrusion 6 of the group 14.

The non-linear protrusions 6 of each of the groups 14 have a helicoidal winding 9 substantially in the same direction and in the same step such that the three protrusions appear twisted together. This makes it possible to further delimit the central volume V for storing cosmetic product.

The groups 14 are arranged in a plurality of rows Rl, Rr which extend over the whole periphery of the core 2.

Subsequently, the longitudinal rows Rl and the radial rows Rr will be distinguished. By longitudinal row Rl, this means a row of groups 14 of protrusions 6, i.e. a succession of groups 14 of aligned or substantially aligned protrusions 6, arranged along the core 2, on one same line. By radial row Rr, this means a row of groups 14 of protrusions 6 arranged around the core 2, in one same plane orthogonal to the core 2, the plane cutting the core 2 along a direction which here, is substantially circular.

The longitudinal rows Rl extend following the longitudinal direction X.

In the embodiments represented, the longitudinal rows Rl have the characteristic of being inclined with respect to the main extension axis X. More specifically, the longitudinal rows Rl here follow substantially helicoidal lines, the lines being drawn on the surface of the core 2, from its first end 2a to its second end 2b. All the longitudinal rows Rl have the same inclination and are parallel to one another.

In an embodiment variant not represented, the longitudinal rows Rl are parallel to the main extension axis X.

The radial spacing between the longitudinal rows Rl around the periphery of the core 2 is made according to a constant angular distance (E±. The angular distance will be included in the interval [0¬∞; 90¬∞]; it will be around 60¬∞.

The embodiment examples illustrated here haves six longitudinal rows Rl, this number of longitudinal rows Rl varying according to the angular distance selected between the longitudinal rows Rl.

In the embodiments represented, the six groups 14 of protrusions 6 of two successive radial rows Rr are offset axially and angularly, against one another, along the extension axis X. This angular offsetting here makes it possible for the formation of the helicoidal longitudinal rows Rl.

In a non-represented embodiment variant, the protrusions 6 of two adjacent longitudinal rows Rl are aligned axially against one another and forms a radial row Rr. Two successive radial rows Rr include the same number of groups 14 of protrusions 6.

Over one same axial portion, the rows have the same number of groups 14 of protrusions 6, as more or less one protrusion. In other words, the rows Rl have substantially the same step between its protrusions 6.

In the example represented in FIG. 2, the longitudinal rows Rl are helicoidal and include sixteen groups 14 of protrusions 6.

Figure 3:
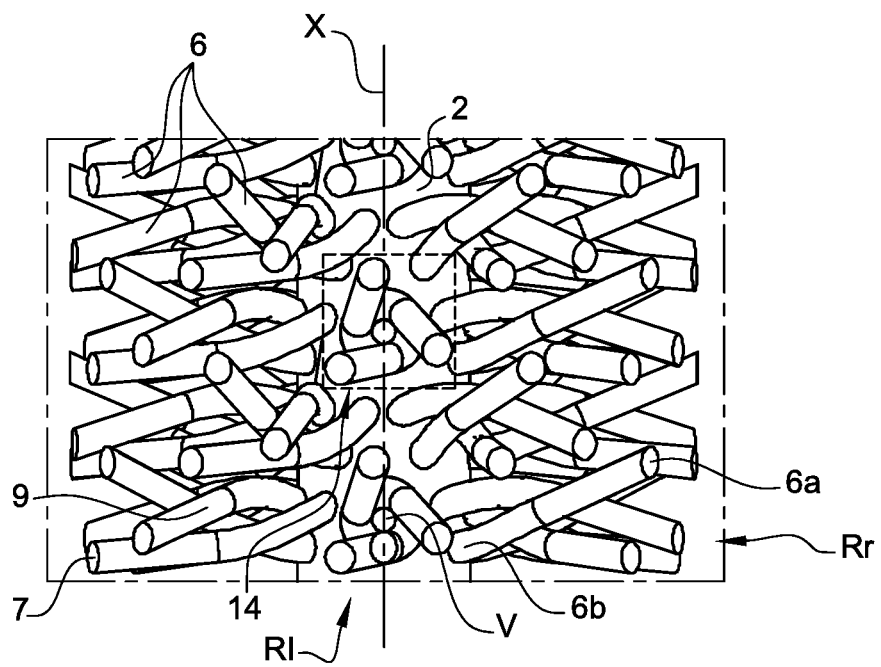
FIG. 3 is a side and detailed view of the protrusions of the applicator of FIG. 2.

In the first embodiment illustrated in FIGS. 2 to 4, the applicator 1 includes protrusions 6 protruding from the core 2 following the radial direction. The protrusions 6 situated towards the second end 2b of the core 2 have different heights H so as to form an ogive-shaped envelope E2. The remainder of the protrusions 6 has one same height H and they themselves form a substantially cylindrical envelope E1. In this embodiment, all the protrusions 6 are smooth and non-linear. They have a helicoidal winding 9 extending over the whole length L. The protrusions 6 are arranged by group 14 of three protrusions 6 on the surface of the core 2 so as to form a triangle, each protrusion 6 being a peak of this triangle. The groups 14 of protrusions 6 are arranged in substantially helicoidal longitudinal rows Rl.

In the second embodiment illustrated in FIGS. 5 to 7, the applicator 1 includes protrusions 6 protruding from the core 2 following the radial direction. The protrusions 6 represented have a same height H so as to form a substantially cylindrical envelope E1. In this embodiment, all the protrusions 6 are non-linear and have a helicoidal winding 9 extending over its whole length L. The protrusions 6 are arranged by group 14 of three protrusions 6 on the surface of the core 2 so as to form a triangle, each protrusion 6 being a peak of this triangle. The groups 14 of protrusions 6 are arranged in substantially helicoidal longitudinal rows Rl. These protrusions 6 further include a groove 13 which extends over the whole length L of the protrusion 6 and which follows the helicoidal winding 9.

Figure 9:
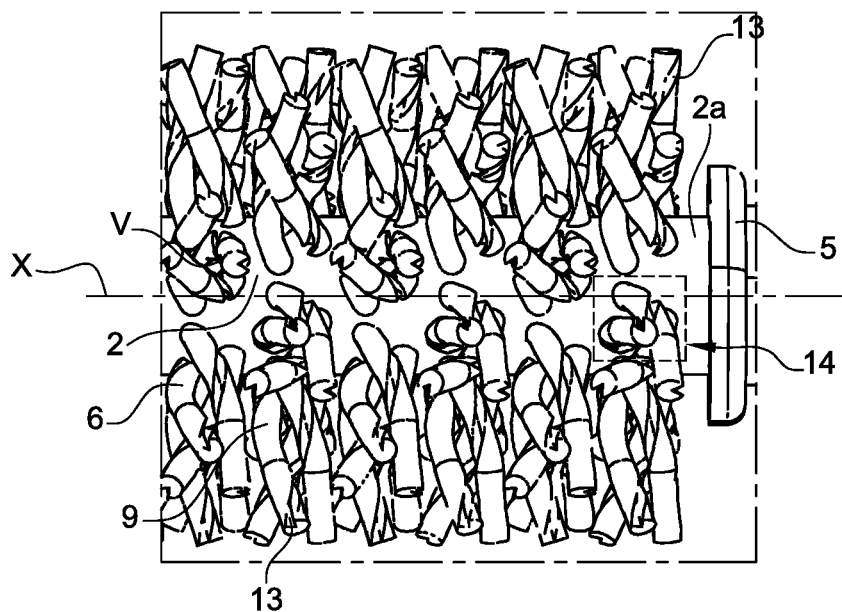
FIG. 9 is a side and detailed view of the protrusions of the applicator of FIG. 8.
Figure 10:
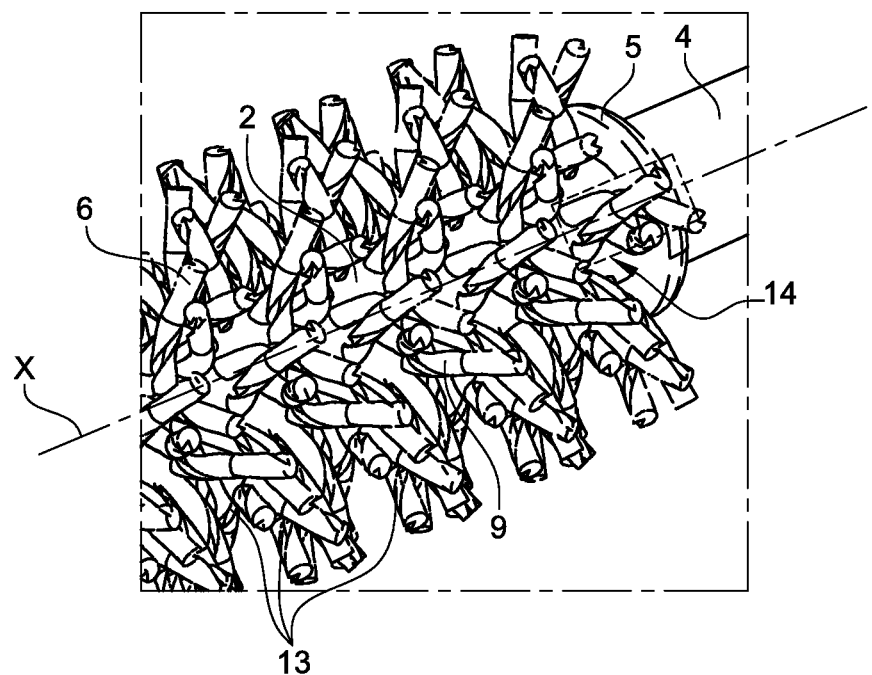
FIG. 10 is an isometric and detailed view of the protrusions of the applicator of FIG. 8.

In the third embodiment illustrated in FIGS. 8 to 10, the applicator 1 includes protrusions 6 protruding from the core 2 following the radial direction. The protrusions 6 represented have one same height H so as to form a substantially cylindrical envelope E1. In this embodiment, all the protrusions 6 are non-linear and have a helicoidal winding 9 extending over its whole length L. The protrusions 6 are arranged by group 14 of three protrusions 6 on the surface of the core 2 so as to form a triangle, each protrusion 6 being a peak of this triangle. The groups 14 of protrusions 6 are arranged in substantially helicoidal longitudinal rows Rl. These protrusions 6 further include a groove 13 which extends over the whole length L of the protrusion 6 and which is wound around the protrusion 6.

Figure 11:
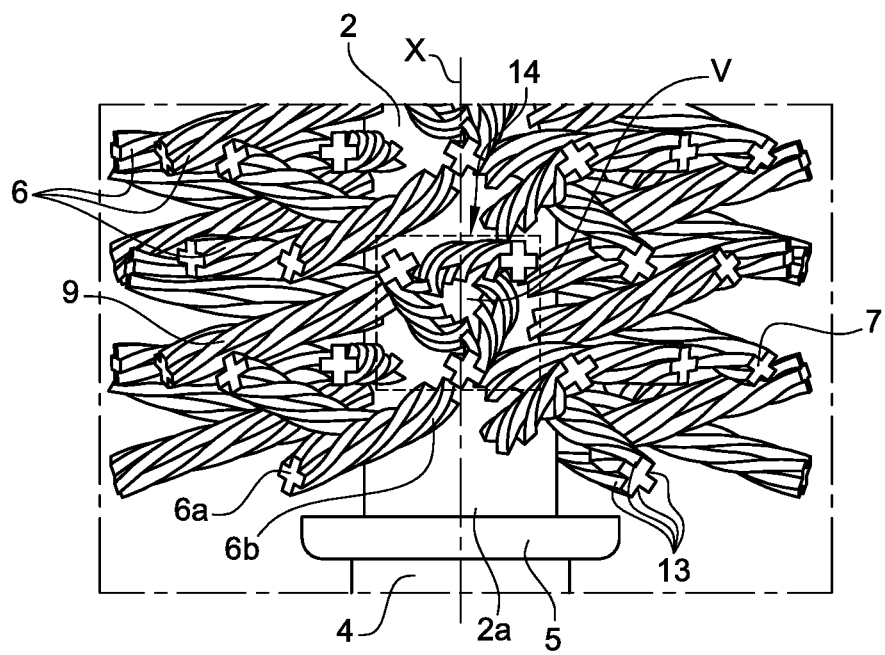
FIG. 11 is a side view of a portion of an applicator according to a fourth embodiment of the invention.

In the fourth embodiment illustrated in FIG. 11, the applicator 1 includes protrusions 6 protruding from the core 2 following the radial direction. The protrusions 6 represented have one same height H so as to form a substantially cylindrical envelope E1. In this embodiment, all the protrusions 6 are non-linear and have a helicoidal winding 9 extending over its whole length L. The protrusions 6 are arranged by group 14 of three protrusions 6 on the surface of the core 2 so as to form a triangle, each protrusion 6 being a peak of this triangle. The groups 14 of protrusions 6 are arranged in substantially helicoidal longitudinal rows Rl. These protrusions 6 further include four grooves 13 which extend over the whole length L of the protrusion 6 and which is wound around the protrusion 6. The four grooves 13 are regularly distributed over the perimeter of the protrusion 6. Thus, protrusions 6 having a cross-shaped transversal cross-section 7 are obtained.

Any other transversal cross-section shape 7 can be considered. The shape of the transversal cross-section 7 of the protrusions 6 is, in particular, determined by the number of grooves 13 have on the protrusion 6. According to the profile of the protrusion 6, the shape of the transversal cross-section 7 can vary along the length of the protrusion 6.

Advantageously, each of the nonlinear protuberances 6 have a similar general profile, i.e., for example, a same number of turn(s), an uniform disposition, a same orientation with respect to the main direction X, a same cross section.

It must also be noted, that the applicator 1 advantageously forms a brush.

Preferably, the applicator 1 described above is obtained by an additive manufacturing method.

By additive manufacturing or additive synthesis method, this means a method of manufacturing by adding material, generally computer-assisted material. Such a manufacturing method is also called three-dimensional printing or also 3D printing.

Using three-dimensional printing to manufacture the applicator 1 makes it possible to produce a core 2 and protrusions 6 with original and complex shapes which could prove to be very complex, or even impossible, to obtain by a conventional injection moulding method. It is thus possible to produce, directly and by one unique manufacturing operation, the complex shape which will give its characteristics to the protrusion. In addition, this technique makes it possible to avoid using complex moulds.

Different additive manufacturing technologies known to a person skilled in the art can be used. In particular, this can be:

fused deposition modelling (FDM),
selective laser melting (SLM),
selective laser sintering (SLS),
electron beam melting (EBM),
stereolithography or photo-polymerisation (SLA for "Stereolithography Apparatus"), or
laminated object manufacturing (LOM).

Preferably, these are sintering and/or stereolithographic technologies.

The invention also concerns a method for manufacturing an applicator 1 such as described above. The method includes:

a step of developing a digital model of the applicator 1;
a step of manufacturing the applicator 1 by means of the digital model.

The digital model is a computerised file which corresponds to a virtual model of the applicator 1. To obtain it, the applicator 1 is first modelled so as to obtain a CAD model which is then converted into a suitable format, such as an .STL file. The file is then exploited on an additive manufacturing machine. During its reading, the digital model is split into a certain number of layers according to the desired precision. Preferably, the layers correspond to a transversal cross-section 7 of the applicator 1, i.e. a cross-section of the applicator 1 taken in a plane perpendicular to the main direction X.

The suitable materials to manufacture the core 2 and the protrusions 6 by three-dimensional printing are polyamides, photosensitive resins, polylactic acid (PLA), acrylonitrile butadiene styrene (ABS).

The invention also concerns an applicator unit 15 for cosmetic product, including a container 17 including a body forming a reservoir intended to contain the cosmetic product (not represented), and an applicator 1, such as described above, adapted to be fixed on the container 17, such that the applicator 1 is housed inside the reservoir. The applicator 1 is fixed, for example, to a proximal end 3a of the rod 3, itself fixed to a stopper 19 advantageously screwed to the container 17.

It must be noted, that after mounting, the sleeve 4 is situated in the rod 3 and the first (proximal) end 2a of the core 2 corresponds to the distal end 3b of the rod.

Furthermore, to avoid the applicator 1 being too loaded with cosmetic product, the container 17 can include a wiper 21, fixed inside the neck. When the user removes the applicator 1 from the container 17, the applicator 1 slides inside the wiper 21. The wiper 21 scrapes the excess cosmetic product on the rod 3 and on the applicator 1.

The wiper 21 thus makes it possible to adjust the quantity of product have on the applicator 1 and avoids an excessive application of cosmetic product on the eyelashes.

Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. An applicator for cosmetic product, comprising:
a core extending along a main direction comprising a longitudinal extension direction, and a plurality of protrusions integral with the core, the protrusions extending from a proximal end connected to the core to a free distal end along an elongation direction so as to define a length;
wherein at least some of the protrusions comprising non-linear protrusions, each has a non-linear generator over at least some of its length,
all or some of the non-linear protrusions have at least one helicoidal winding over at least some of their length comprising a helicoidal winding portion, and
at least some of said non-linear protrusions are implanted to constitute a plurality of groups in each of which said non-linear protrusions are arranged so as to delimit centrally a space forming a cosmetic product reservoir;
wherein at least one of the groups comprises at least three non-linear protrusions, the at least three non-linear protrusions of each of the groups are unaligned, and each of the groups of the at least three non-linear protrusions defines a cosmetic product reservoir cavity.

2. The applicator according to claim 1, wherein the non-linear protrusions of each group are installed on a surface of the core so as to form a polygon.

3. The applicator according to claim 1, wherein the protrusions comprise at least one groove.

4. The applicator according to claim 1, wherein the groove extends parallel to said at least one helicoidal winding and/or by winding around the protrusion.

5. The applicator according to claim 1, wherein the applicator is obtained by additive manufacturing.

6. The applicator unit for cosmetic product, comprising:
a container comprising a body forming a reservoir intended to contain the cosmetic product, and
an applicator of the cosmetic product adapted to be fixed on the container, such that the applicator is housed inside the reservoir, the applicator comprising:
a core extending along a main direction comprising a longitudinal extension direction, and a plurality of protrusions integral with the core, the protrusions extending from a proximal end connected to the core to a free distal end along an elongation direction so as to define a length;

wherein at least some of the protrusions comprising non-linear protrusions, each has a non-linear generator over at least some of its length, and at least some of said non-linear protrusions are implanted to constitute a plurality of groups in each of which said non-linear protrusions are arranged so as to delimit centrally a space forming a cosmetic product reservoir;

wherein at least one of the groups comprises at least three non-linear protrusions, the at least three non-linear protrusions of each of the groups are unaligned, and each of the groups of the at least three non-linear protrusions defines a cosmetic product reservoir cavity.

7. An applicator for cosmetic product, comprising:

a core extending along a main direction comprising a longitudinal extension direction, and a plurality of protrusions integral with the core, the protrusions extending from a proximal end connected to the core to a free distal end along an elongation direction so as to define a length;

wherein at least some of the protrusions comprises non-linear protrusions, wherein each has a non-linear generator over at least some of its length, all or some of the non-linear protrusions have at least one helicoidal winding over at least some of their length comprising a helicoidal winding portion, wherein at least some of said non-linear the protrusions are implanted to constitute a plurality of groups in each of which said non-linear of at least three non-aligned protrusions are arranged so as to delimit centrally a space forming a cosmetic product reservoir cavity; and, wherein the at least three non-aligned protrusions are inclined towards each other along the longitudinal extension direction and define a surface of revolution corresponding to the cosmetic product reservoir cavity.

* * * * *